United States Patent
Peterson

(10) Patent No.: US 8,368,720 B2
(45) Date of Patent: Feb. 5, 2013

(54) METHOD AND APPARATUS FOR LAYER-BASED PANORAMA ADJUSTMENT AND EDITING

(75) Inventor: John W. Peterson, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1151 days.

(21) Appl. No.: 11/610,099

(22) Filed: Dec. 13, 2006

(65) Prior Publication Data

US 2008/0143820 A1    Jun. 19, 2008

(51) Int. Cl.
    *G09G 5/00* (2006.01)
(52) U.S. Cl. ............................................. 345/629
(58) Field of Classification Search .................. 348/36
    See application file for complete search history.

(56) References Cited

U.S. PATENT DOCUMENTS

| | | | |
|---|---|---|---|
| 6,359,617 B1 | 3/2002 | Xiong | |
| 6,785,427 B1 | 8/2004 | Zhou | |
| 2002/0114536 A1* | 8/2002 | Xiong et al. | 382/284 |
| 2002/0135672 A1 | 9/2002 | Sezan et al. | |
| 2004/0095357 A1* | 5/2004 | Oh et al. | 345/589 |
| 2004/0196282 A1* | 10/2004 | Oh | 345/419 |
| 2005/0063608 A1 | 3/2005 | Clarke et al. | |
| 2005/0099494 A1 | 5/2005 | Deng et al. | |
| 2006/0029290 A1 | 2/2006 | Edwards | |
| 2006/0171702 A1* | 8/2006 | Guillou et al. | 396/310 |
| 2006/0203959 A1* | 9/2006 | Spartiotis et al. | 378/38 |
| 2006/0262184 A1 | 11/2006 | Peleg et al. | |

OTHER PUBLICATIONS

Adobe Photoshop, Version 4.0.1 Release 1, Apr. 1997; File Format Specification; Adobe Systems Incorporated, 345 Park Avenue San Jose, California 95110.*
International Search Report for PCT/US 07/86584, mailed Apr. 10, 2008.
Agarwala, A., et al., "Interactive digital photomontage," ACM Transactions on Graphics (Proc. SIGGRAPH), 23(3), 294-302, 2004.
Szeliski, Richard, "Image Alignment and Stitching: A Tutorial," Microsoft Technical Report MSR-TR-2004-92, Dec. 10, 2006.

\* cited by examiner

*Primary Examiner* — Edward Martello

(57) ABSTRACT

Method and apparatus for layer-based panoramic image blending, adjustment and editing. A panoramic image mechanism may provide the automated generation of a panoramic image from a set of input images. The panoramic image may be generated, organized and persisted as a set or stack of component layers, which enables manual modification of the component layers to optimize the panoramic image. The panoramic image mechanism may include scripts and associated user interface mechanisms that automate the generation of a panoramic image and that may provide users access to the adjustment and edit mechanisms, and that thus enable users to retouch the automatically-generated panoramic images.

21 Claims, 18 Drawing Sheets

100

102A 102B    102C

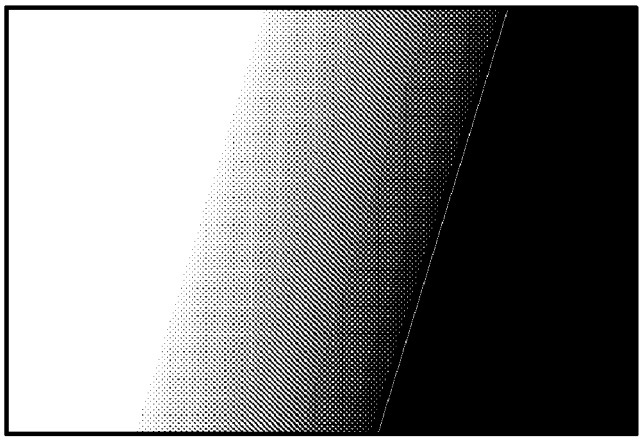

METHOD AND APPARATUS FOR LAYER-BASED PANORAMA ADJUSTMENT AND EDITING

BACKGROUND

1. Field of the Invention

This invention relates to computer systems, specifically to computer-aided image processing, and more specifically to the merging of images to form a panoramic image.

2. Description of the Related Art

Image capture devices, such as cameras, may be used to capture an image of a section of a view or scene, such as a section of the front of a house. The section of the view or scene whose image is captured by a camera is known as the field of view of the camera. Adjusting a lens associated with a camera may increase the field of view. However, there is a limit beyond which the field of view of the camera cannot be increased without compromising the quality, or "resolution", of the captured image. Further, some scenes or views may be too large to capture as one image with a given camera at any setting. Thus, it is sometimes necessary to capture an image of a view that is larger than can be captured within the field of view of a camera. In these instances, multiple overlapping images of segments of the view or scene may be taken, and then the images may be joined together, or "merged," to form a composite image, known as a panoramic image.

Many computer programs and algorithms exist for automatically assembling a single panoramic image from multiple overlapping component images. Conventional computer programs for performing automatic panorama assembly generally concentrate on tools for automating the entire process, but operate under the assumption that the final output (the panoramic image) is the acceptable result, and that further manual or hand-modification is not needed.

While automated systems often do a good job in generating panoramic images, many situations, and demanding professional photographers and artists, may require exact control over how the images are blended together, their exposure and color balance settings, how the images overlap, and so on. Especially with automatic cameras or cameras set to automatic mode, the parameters or settings on a camera may differ between images, and thus two overlapping images of a scene may have different levels of exposure, color balance, brightness, contrast, hue and saturation, white and black points, and so on. In addition, artifacts may appear in one image that do not appear in an overlapping region of another image. Moving objects may also pose problems, as a moving object may not be in the same relative position in two overlapping images; for example, a moving object may appear in two different places in two overlapping images. In addition, aspects of a scene may not line up properly after an automatically generated alignment, generating misalignment artifacts. Control over the automatic panoramic image generation process may be manually achieved to correct for at least some of these problems or other problems using some image processing applications such as Adobe Photoshop®, but such control typically requires many tedious steps to achieve a desired result.

Further, conventional computer programs for automatically assembling a single panoramic image from multiple overlapping images typically generate the panoramic image as a single image element, with pixels in the actual image manipulated or modified to achieve the desired result, making further corrections to the final panoramic image difficult if not impossible.

SUMMARY

Various embodiments of a method and apparatus for layer-based panoramic image blending, adjustment and editing are described. Embodiments of a panoramic image mechanism may provide the automated generation of a panoramic image from a set of input images. The panoramic image may be generated, organized and persisted as a set or stack of component layers, which enables embodiments to provide the user with mechanisms for manual modification of the component layers to hand-optimize the panoramic image, for example using existing and familiar tools. In one embodiment, the panoramic image mechanism may include scripts and associated user interface mechanisms that automate the generation of a panoramic image and that may provide users access to the adjustment and edit mechanisms, and that thus enable users to retouch the automatically-generated panoramic images. Thus, embodiments may enable the assembly, blending, and adjustment of a panoramic image from multiple component images, while still allowing full manual control over the resulting panoramic image.

A panoramic image may be formed by taking two or more overlapping photographs (or images) of a scene, and bringing the images into alignment. The overlapping areas or regions of the images may be blended together by automatically creating gradient-blend masks on the overlapping areas. These blended areas may be stored as layer masks or blend masks. The blend masks are user-modifiable via the panoramic image mechanism to improve the resulting panoramic image, for example to unmask artifacts that are visible in an underlying image but blocked by an overlying image. Note that the original component images may not be modified, but instead may be stored and maintained with their original image content. Adjustment layers may be applied by the user as necessary or desired to correct for exposure, color balance, contrast, or other differences between the component images. The components (images, blend masks, and adjustment layers) that together form the panoramic image may be organized and stored together in a panoramic image file as separate layers.

In one embodiment, scripts that leverage one or more built-in features of an image processing application may be used by the panoramic image mechanism to implement and automate the layer-based panoramic image alignment, blending, adjustment and editing processes as described herein. In one embodiment, one or more scripts may be used to leverage one or more built-in features of an image processing application to construct the panoramic image from a set of input images. However, unlike conventional mechanisms for generating panoramic images, the panoramic image mechanism, using the scripts, may generate a resulting panoramic image as a set of multiple overlapping layers, or layer stack, which may include, but is not limited to, image layers, blend layers, and adjustment layers. The layers in the layer stack may then be used in combination to generate and display a blended, adjusted panoramic image. The layer stack may be organized and stored in a panoramic image file. The panoramic image file may later be recalled to construct the panoramic image for display or printing, to view or modify one or more of the component layers if necessary or desired, to add or delete adjustment layers, or to otherwise manipulate the panoramic image. Note that the pixels in the component images are not modified; modifications to the pixel values are made in the process of generating the panoramic image from the stack of layers, or layer stack.

Scripts may be used to add, delete, and otherwise manage adjustment layers, enabling the correction of exposure, color balance, brightness, and other differences of one or more of the component images to better match the rest of the panoramic scene. Further, scripts may be used to enable the manual editing of the blend masks to enable exact control over the visibility of the various component images, allowing for the manual correction of moving objects, misregistration artifacts, and other possible problems.

BRIEF DESCRIPTION OF THE DRAWINGS

FIG. 5 graphically illustrates a blend mask, according to one embodiment.

FIG. 6A illustrates an exemplary blend mask as automatically generated, according to one embodiment.

FIG. 6B illustrates an exemplary manually edited blend mask, according to one embodiment.

Figure 1:
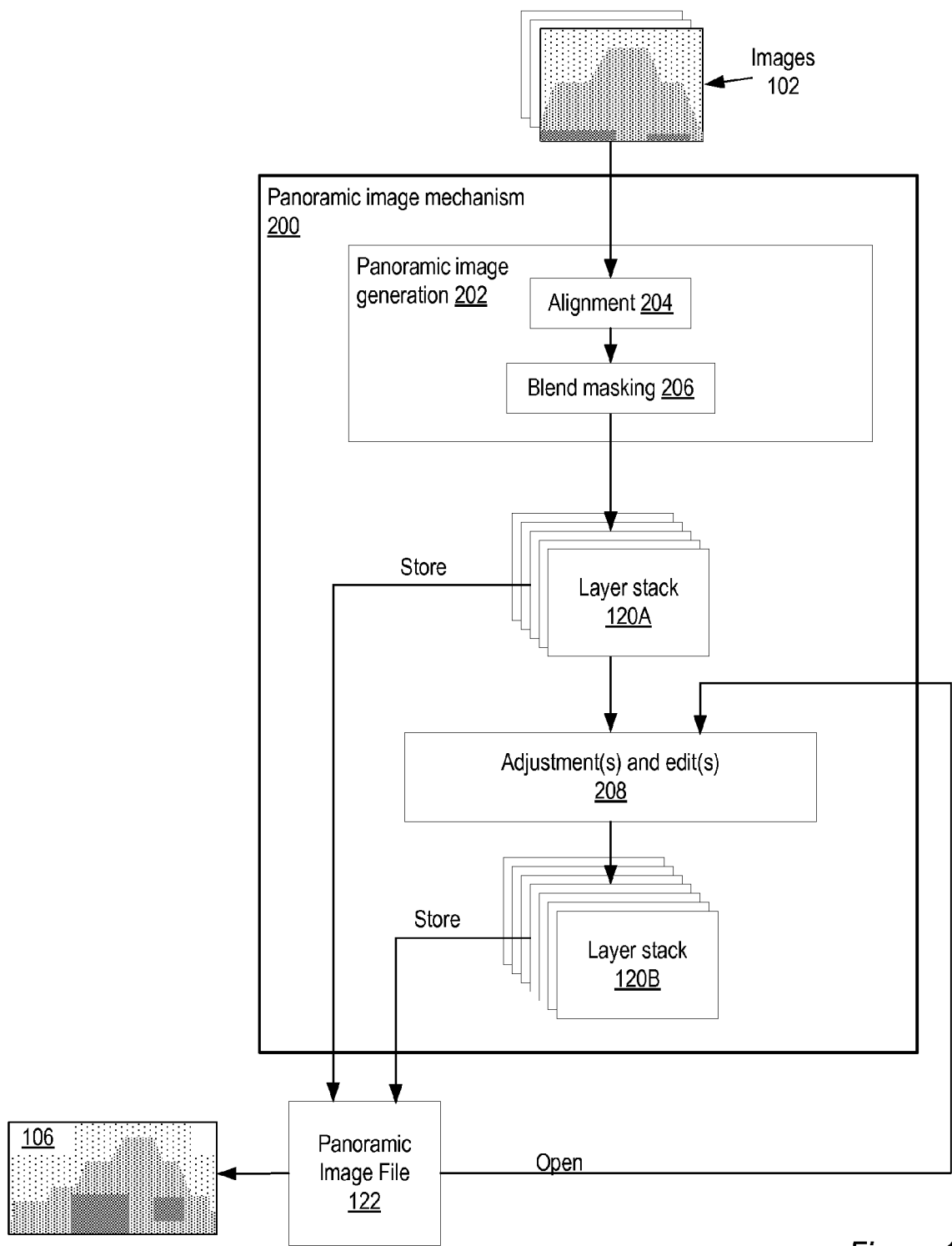
FIG. 1 illustrates the operation of and dataflow of a panoramic image mechanism according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for layer-based panoramic image blending, adjustment and editing are described. Embodiments of the layer-based panoramic image alignment, blending, adjustment and editing methods as described herein may be implemented by a panoramic image mechanism. Embodiments of the panoramic image mechanism may provide the automated generation of a panoramic image from a set of input images. The panoramic image may be generated and maintained as a stack of components or layers in a layer stack. The components, which may include the original images, blend masks, and adjustment layers that may be added by the user, may be organized and persisted as layers so that the individual components of the resulting panoramic image may be manually manipulated as necessary or desired.

The panoramic image may be organized and persisted as a set or stack of component layers, which enables embodiments to provide the user with mechanisms for manual modification of the component layers to hand-optimize the panoramic image, for example using existing image editing tools. In one embodiment, the panoramic image mechanism may include scripts and associated user interface mechanisms that may be used to provide users access to various adjustment and edit tools, and that thus enable the users to retouch the automatically-generated panoramic images. Thus, embodiments may enable the assembly, blending, and adjustment of a panoramic image from multiple component images, while still allowing full manual control over the resulting panoramic image.

A panoramic image may be formed by taking two or more overlapping photographs (or images) of a scene, and bringing the images into alignment. The overlapping areas or regions of the images may be blended together by automatically creating gradient-blend masks on the overlapping areas. Exemplary methods and systems for merging images to form a panoramic image are described in U.S. Pat. No. 6,411,745, titled "Merging Images To Form A Panoramic Image", issued Jun. 25, 2002, whose inventor is John Peterson, and in U.S. Pat. No. 7,095,905, titled "Merging Images To Form A Panoramic Image", issued Aug. 22, 2006, whose inventor is John Peterson, which are both herein incorporated by reference in their entirety. Note that other methods and systems for merging images to form a panoramic image may be used in embodiments.

In embodiments of the panoramic image mechanism as described herein, these blended areas may be stored as layer masks or blend masks. The blend masks are user-modifiable to improve the resulting panoramic image, for example to unmask artifacts that are visible in an underlying image but blocked by an overlying image. Note that the original component images may not be modified, but instead may be stored and maintained with their original image content. Adjustment layers may be applied by the user as necessary or desired to correct for exposure, color balance, contrast, or other differences between the component images. The components (images, blend masks, and adjustment layers) that together form the panoramic image may be organized and stored together in a panoramic image file as separate layers.

A layer may be defined as a component of a panoramic image. Layers may be stacked atop each other, similar to the way sheets of paper are stacked, to form a composite panoramic image. An adjustment layer may be defined as a special type of layer that modifies the properties of an image component or layer, for example the brightness, contrast, color balance, white and black points, etc., without modifying the actual image data in the image component. A layer mask or blend mask may be defined as a monochrome image that determines the visibility of the corresponding pixels in an image component or layer. For example, if an area of mask pixels are white, then the corresponding image layer pixels are visible; if an area of mask pixels are black, then the corresponding image layer pixels are transparent. Intermediate values of the mask pixels may be used in performing a blend operation on the corresponding pixels in image layers beneath the masked image layer.

In one embodiment, scripts that leverage one or more built-in features of an image processing application may be used by the panoramic image mechanism to implement and automate the layer-based panoramic image alignment, blending, adjustment and editing processes as described herein. In one embodiment, one or more scripts may be used to leverage one or more built-in features of an image processing application to construct the panoramic image from a set of input images. However, unlike conventional mechanisms for generating panoramic images, the panoramic image mechanism, using the scripts, may generate a resulting panoramic image as a set of multiple overlapping layers, or layer stack, which may include, but is not limited to, image layers, blend layers, and adjustment layers. The layers in the layer stack may then be used in combination to generate and display a blended, adjusted panoramic image. The layer stack may be organized and stored in a panoramic image file. The panoramic image file may later be recalled to construct the panoramic image for display or printing, to view or modify one or more of the component layers if necessary or desired, to add or delete adjustment layers, or to otherwise manipulate the panoramic image. Note that the pixels in the component images are not modified; modifications to the pixel values are made in the process of generating the panoramic image from the stack of layers, or layer stack.

Scripts may also be used to add, delete, and otherwise manage adjustment layers, enabling the correction of exposure, color balance, brightness, and other differences of one or more of the component images to better match the rest of the panoramic scene. The set of blending layer masks, or blend masks, may be manually retouched to enable exact control over the visibility of the various component images, allowing for the manual correction of moving objects, mis-registration artifacts, and other possible problems.

In contrast, conventional image processing mechanisms for generating panoramic images, whether automated, manual, or a combination thereof, generate a resulting panoramic image that is a single image and that is not composed of multiple overlapping image, blend and adjustment layers. Further, conventional image processing mechanisms for generating panoramic images directly modify the pixels in the panoramic image to apply the blend masking and adjustments. Once the panoramic image is generated, it is not easily modifiable, and not directly modifiable at all at the individual image level. The user would generally have to start over from scratch with the original images to make extensive adjustments or to modify the blending. Further, at least some conventional image processing mechanisms for generating panoramic images are not automated or not fully automated and thus may require extensive manual manipulation, including the manual blending of composite images using manually created layer masks and many operations to add or remove adjustments to the panoramic image, and thus require extensive knowledge of the capabilities and mechanisms of the image processing application, and considerable time and effort, to perform effective panoramic image construction.

Note that, while embodiments are described as using scripts that leverage features of an image processing application to automate and perform the various tasks of the panoramic image generation method as described herein, some embodiments may be implemented as software components or modules of an image processing application, as plug-in modules to an image processing application, or as a combination of scripts and software components/modules of an image processing application.

FIG. 1 illustrates the operation of and dataflow of a panoramic image mechanism according to one embodiment. Two or more digital images 102 may be captured of a scene. The images 102 may be distinct, but may overlap to capture different segments of the scene. Panoramic image mechanism 200 may first perform panoramic image generation 202, which may include but is not limited to image alignment 204 and blend masking 206, to automatically generate an aligned and blend masked panoramic image from the two or more input images 102. Output of panoramic image generation 202 may include, but is not limited to, image alignment information and a layer stack 120A including the original input images 102 as components, and one or more blend masks as layers. A blend mask may determine the visibility of the corresponding pixels in an image component or layer. For example, if an area of mask pixels are white, then the corresponding image layer pixels are visible; if an area of mask pixels are black, then the corresponding image layer pixels are transparent. Intermediate values of the mask pixels may be used in performing a blend operation on the corresponding pixels in image layers beneath the masked image layer. In one embodiment, the layer stack 120A and possibly other information (e.g., image alignment information) may be, but is not necessarily, stored to a panoramic image file 122.

After panoramic image generation 202, a user may manually perform adjustments and edits 208 to the panoramic image on individual layers of the layer stack 120A as necessary or desired. An adjustment may be performed to modify the properties of an image component or layer, for example the brightness, contrast, color balance, etc. Adjustments are generated as adjustment layers and inserted into the layer stack 120A to generate a modified layer stack 120B. The use of adjustment layers allows adjustments to the individual image components to be made without modifying the actual image data in the image components. An edit may be performed, for example, to a blend mask. For example, a blend masks may be manually edited to enable exact control over the visibility and blending of the various component images, allowing for the manual correction of moving objects, mis-registration artifacts, and other possible problems.

In one embodiment, the modified layer stack 120B and possibly other information (e.g., image alignment information) may be, but is not necessarily, stored to a panoramic image file 122. The layer stack 120 may later be recalled from the panoramic image file 122 to display or print the panoramic image 106, to perform additional adjustments or edits 208, to undo previous adjustments or edits 208, or for other purposes.

Figure 2:
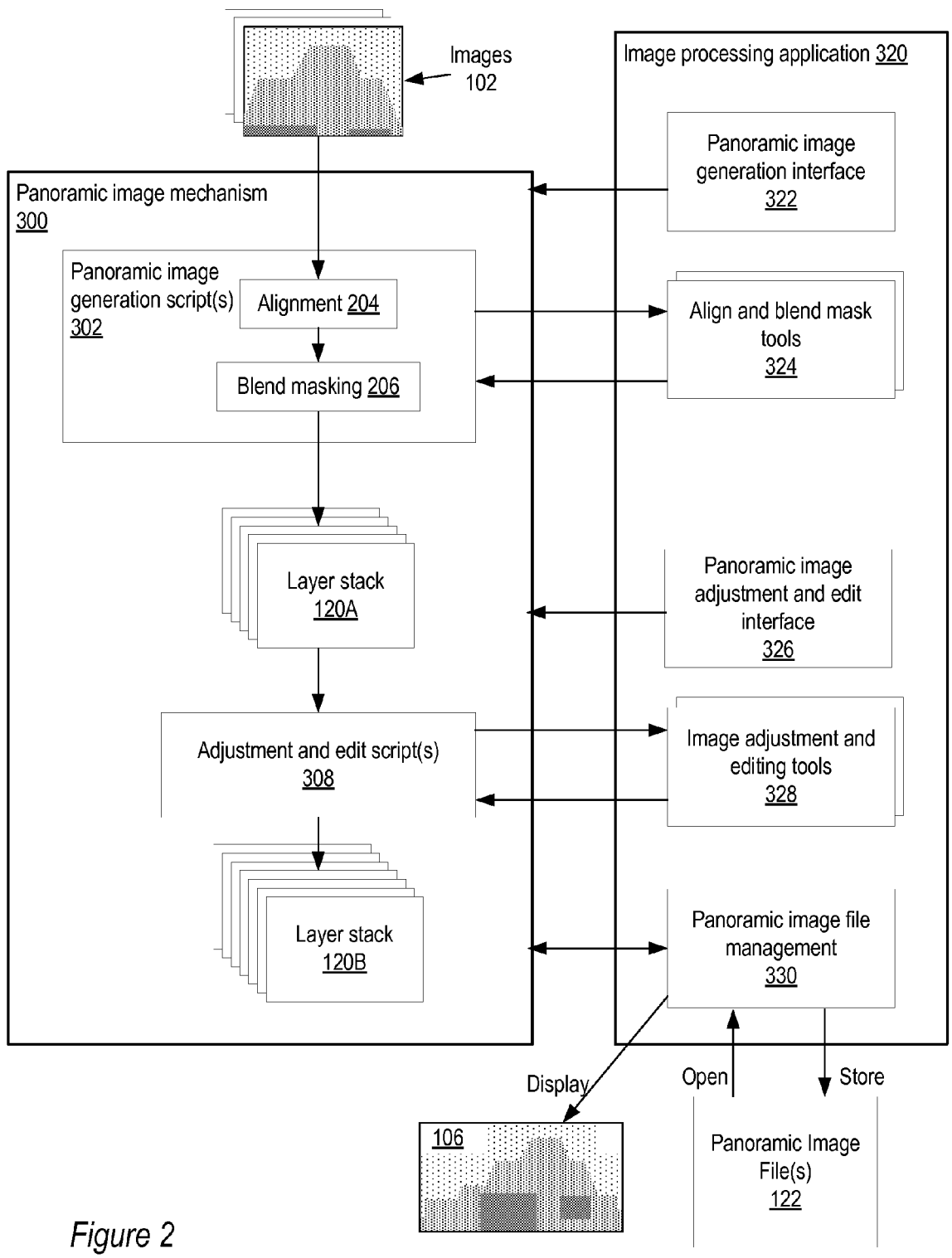
FIG. 2 illustrates the operation of and dataflow of a panoramic image mechanism that uses scripts to leverage one or more tools provided by an image processing application according to one embodiment.

FIG. 2 illustrates the operation of and dataflow of a panoramic image mechanism that uses scripts to leverage one or more tools provided by an image processing application according to one embodiment. An image processing application 320 may provide one or more tools or mechanisms for performing various tasks or portions of the panoramic image generation, adjustment, and editing operations. Embodiments may include one or more user interface mechanisms that allow the user to invoke various scripts provided by panoramic image mechanism 300. The scripts and user interface mechanisms may automate the task of generating a panoramic image 106 from a set of input images 102, including automatically aligning the images and automatically generating blend masks as a starting point, using at least in part tools or mechanisms provided by the image processing application 320 that are invoked by scripts provided by the panoramic image mechanism 300. The blend masks may then be accessed and manually retouched using image editing tools provided by the image processing application 320 for hand-optimized results. The scripts and user interface mechanisms may also enable the addition and removal of adjustment layers using at least in part tools or mechanisms provided by the image processing application 320 in just a few clicks.

In one embodiment, a panoramic image generation script 302 may be used in the panoramic image mechanism 300 to invoke an align image mechanism or tool 324 of the image processing application 320 to automatically align the component images 102 to form a panoramic image. In one embodiment, the image processing application 320 may include a panoramic image generation interface 322 for invoking the panoramic image generation script 302. In one embodiment, by analyzing the geometry of overlapping images, a rectangle or trapezoid may be defined, and a gradient blend may be used to form a blend mask with an overlapping image and one or more other images beneath the image in the image stack that the image overlaps. When this process is completed, the resulting image may be smoothly blended together using the blend mask(s). The generated blend mask(s) may be maintained by the panoramic image mechanism 300 as layers in a layer stack 120A along with the component images 102. In one embodiment, the blend mask(s) may thus be manually retouched, for example to accommodate for an object moving while the photos were taken or to remove an artifact caused by misalignment. In one embodiment, tools or mechanisms provided by the image processing application 320 may be used to retouch the blend mask(s), for example to expose a portion of an image that is hidden or masked out by a blend mask or to hide a portion of an image that is exposed by a blend mask.

In one embodiment, a script 308 may be configured to automate the task of adding or removing adjustment layers for the component images 102 to correct or adjust brightness, exposure, color balance, contrast, hue and saturation, etc., in the individual images 102 at the direction of a user, to correct for differences between component images. In one embodiment, the image processing application 320 may include a panoramic image adjustment and edit interface 326 for invoking the adjustment and edit script(s) 308. In one embodiment, a script 308 may be configured to place or display the adjustment layer(s) in group folder(s) along with associated images 102 and blend masks, creating the folder(s) if necessary. A script 308 may also be configured to allow for the removal of adjustment layers if the adjustment layers are later found to be unnecessary.

Image processing application 320 may include or provide panoramic image file management 330 component(s). Panoramic image file management 330 component(s) may be configured to manage panoramic image file(s) 120, and may provide, for example, tools or mechanisms for creating new panoramic image files 120, for opening existing files 120, for storing layers into files 120, and so on. Panoramic image file management 330 component(s) may also provide tools or mechanisms for rendering panoramic images 106 from layers stored in panoramic image files 120, for displaying and printing panoramic images 106, and so on.

FIGS. 3A through 3H graphically illustrate the process of generating a layer-based panoramic image, including the alignment of the images, blending using blend masks, and adjustment using adjustment layers, according to one embodiment. The process illustrated in FIGS. 3A through 3H may be implemented by embodiments of a panoramic image mechanism as described in FIGS. 1 and 2. Note that three images are used for illustrative purposes; two or more images may be captured and processed using embodiments of the panoramic image mechanism as described herein to generate a panoramic image.

Figure 3A:
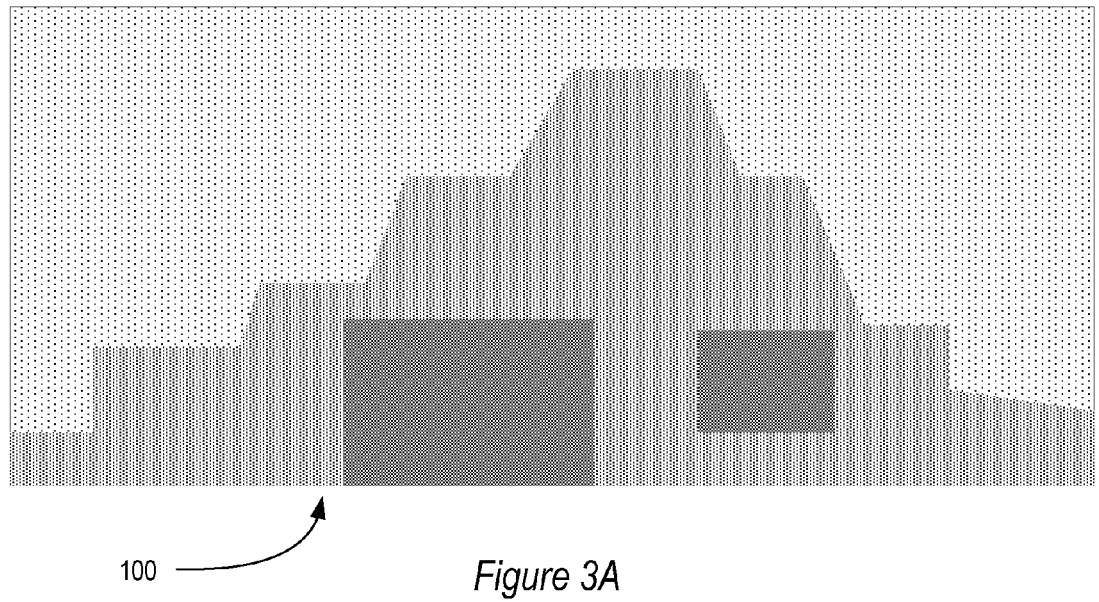
FIGS. 3A through 3H graphically illustrate the process of generating a layer-based panoramic image, including the alignment of the images, blending using blend masks, and adjustment using adjustment layers, according to one embodiment.
Figure 3B:
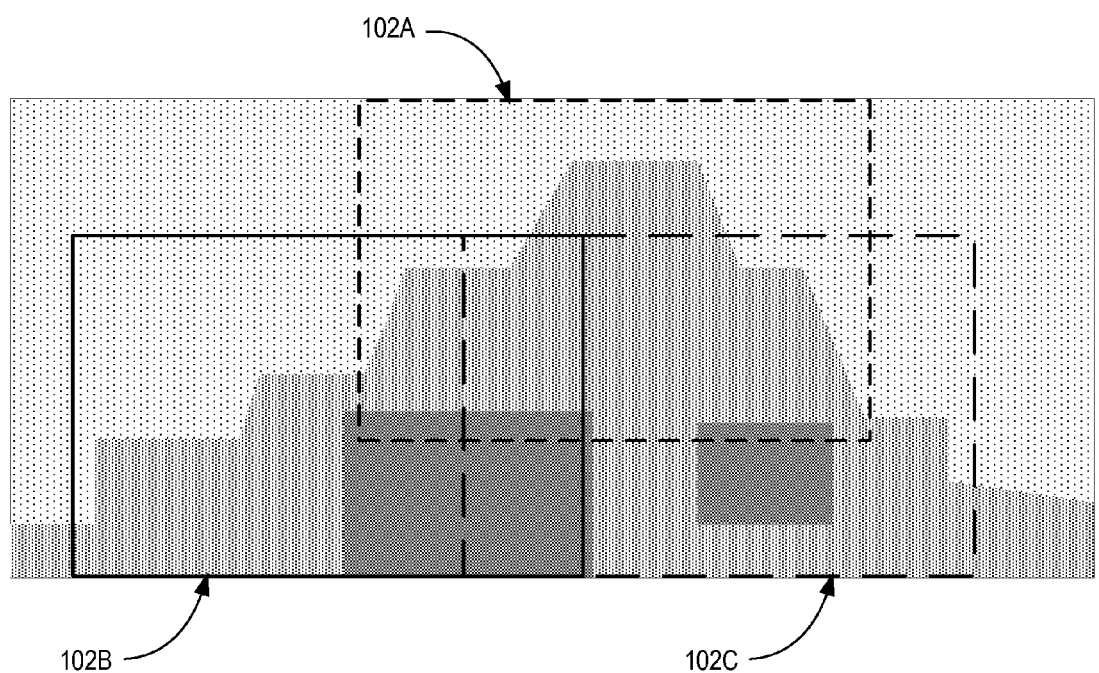
Figure 3C:
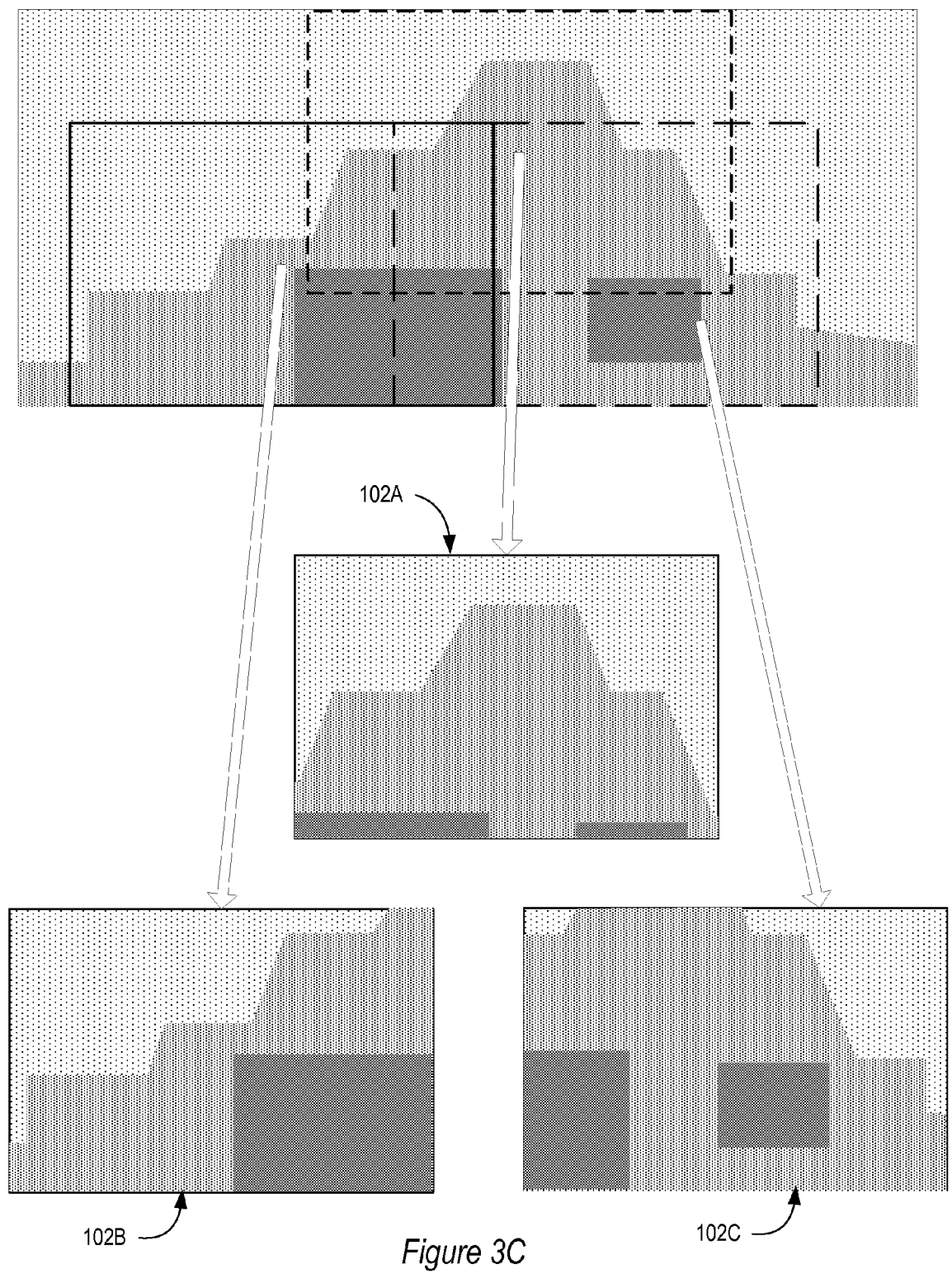

FIG. 3A illustrates an exemplary scene 100 that a photographer may be interested in capturing. However, a scene may be too large to be captured in one image. Thus, as illustrated in FIG. 3B, the scene 100 is captured as three overlapping images, images 102A, 102B, and 102C. The images may be captured using a digital camera or using a standard camera with negative film. If captured using a standard camera with negative film, the negatives or prints generated therefrom may, for example, be digitized using a negative scanner, standard scanner, or other digitizing technique, to generate digital images. FIG. 3C illustrates the three distinct digital images 102A, 102B, and 102C.

Figure 3D:
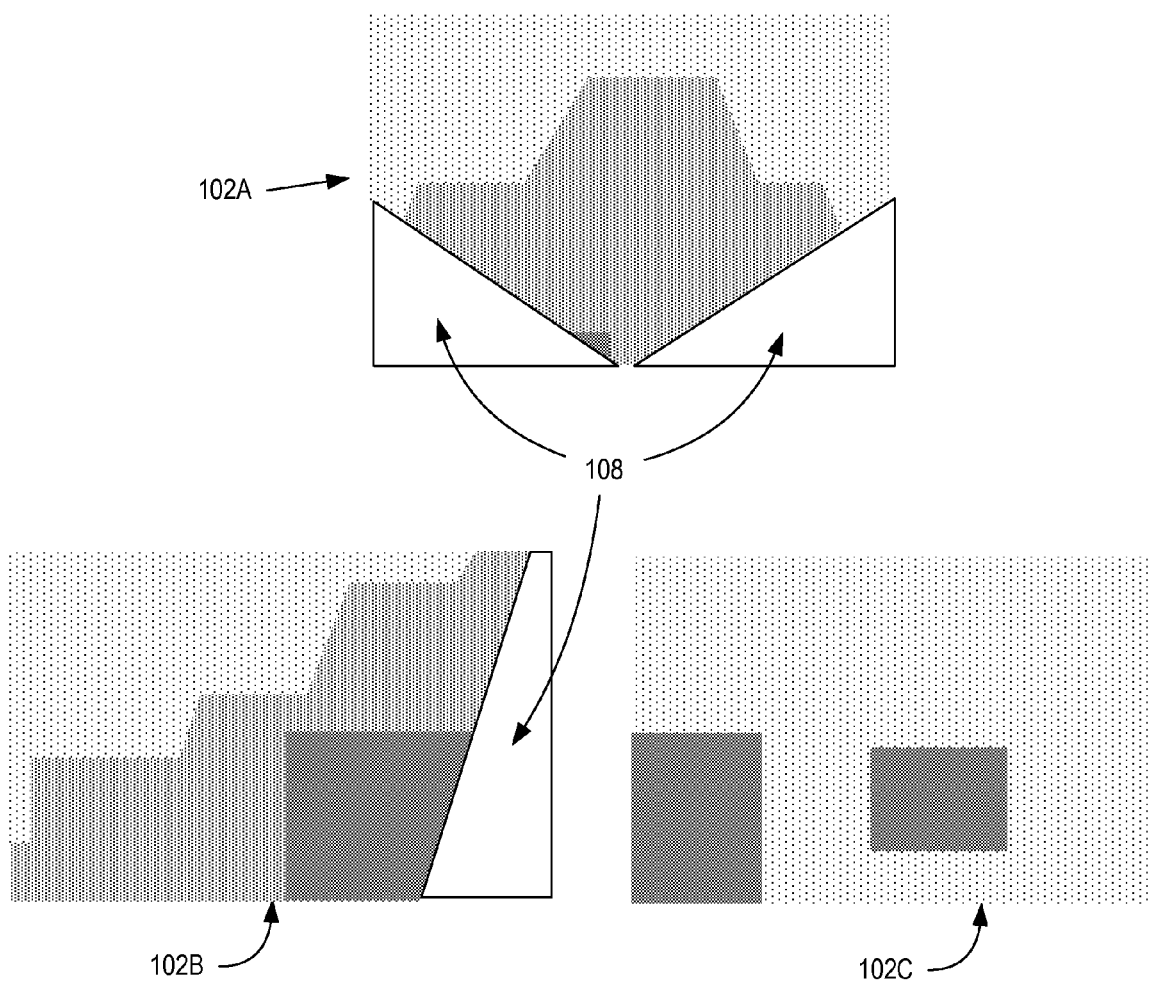

FIG. 3D shows the three images 102A, 102B, and 102C during the alignment and blend masking process. Image 102C will be at the rear, with image 102B overlapping image 102C, and image 102A overlapping both images 102B and 102C. Note the whited-out regions 108 of images 102A and 102B that represent regions of the images that are to be blended with the underlying image(s) 102.

Figure 3E:
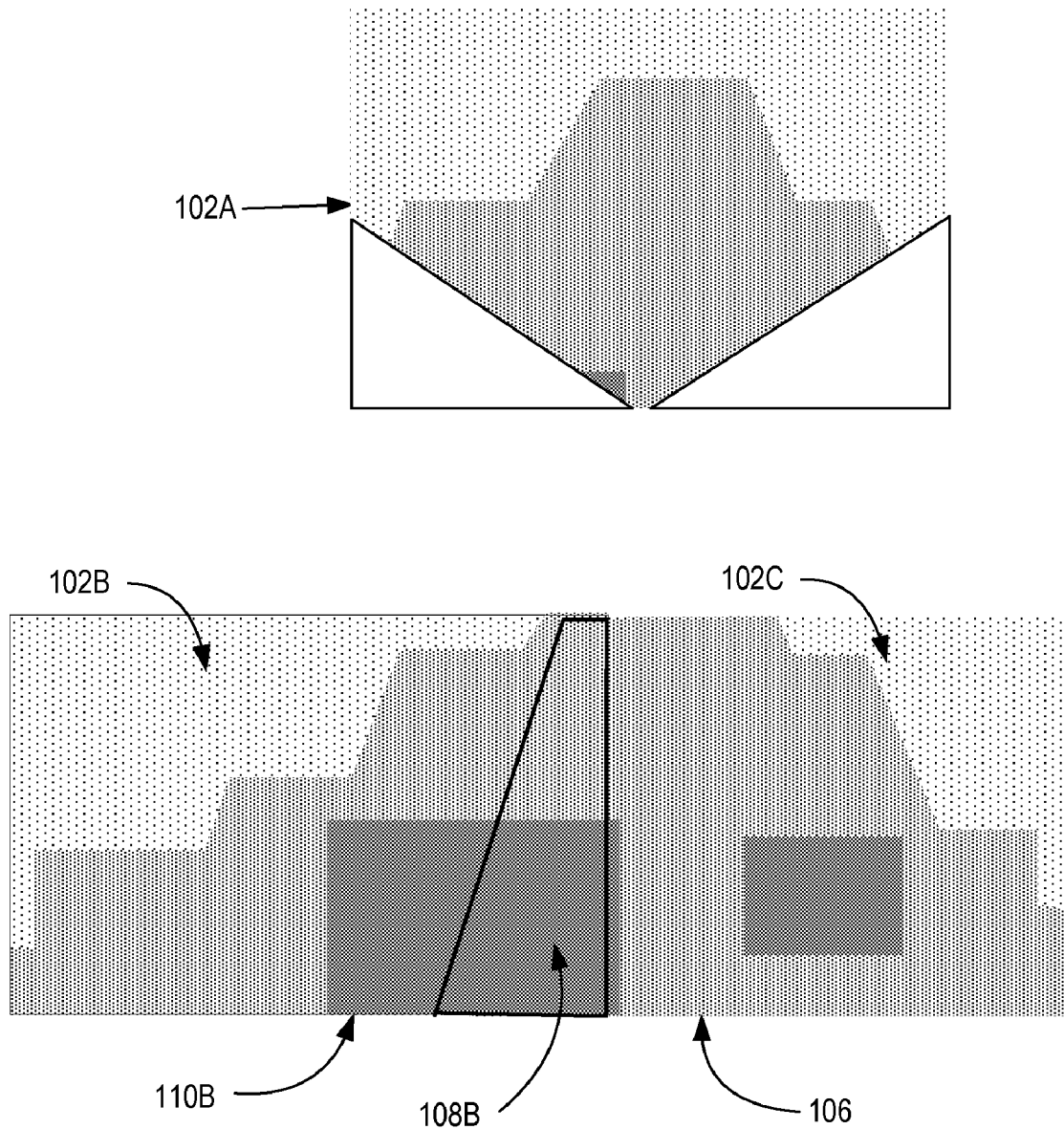

FIG. 3E shows image 102B overlapping and aligned with image 102C to form the partial panoramic image 106. Region 108B represents an overlapping portion of the two images and is the blended region of the two images. Note again that image 102B overlaps image 102C in panoramic image 106. Rectangle (blend mask) 110B, which includes region 108B, represents a blend mask that may be generated for blending the images. Each element or entry in blend mask 110B represents a value that determines or specifies the visibility of a corresponding pixel in the images associated with the blend mask (for blend mask 110B, images 102B and 102C). Note that, while blend mask 110B is shown in FIG. 3E as a rectangle that encompasses the entire image, the actual blend mask 110B may be a smaller rectangle or trapezoid that encompasses only a portion of the image that includes at least the blend region 108B. In other words, blend masks 110 may be created and maintained as data structures that encompass the entire image and that thus include one entry or masking element for each pixel in a corresponding image, or alternatively may be created and maintained as smaller data structures that encompass only a portion of the image. See FIG. 5 and FIGS. 6A and 6B for illustrations of exemplary blend masks.

Figure 3F:
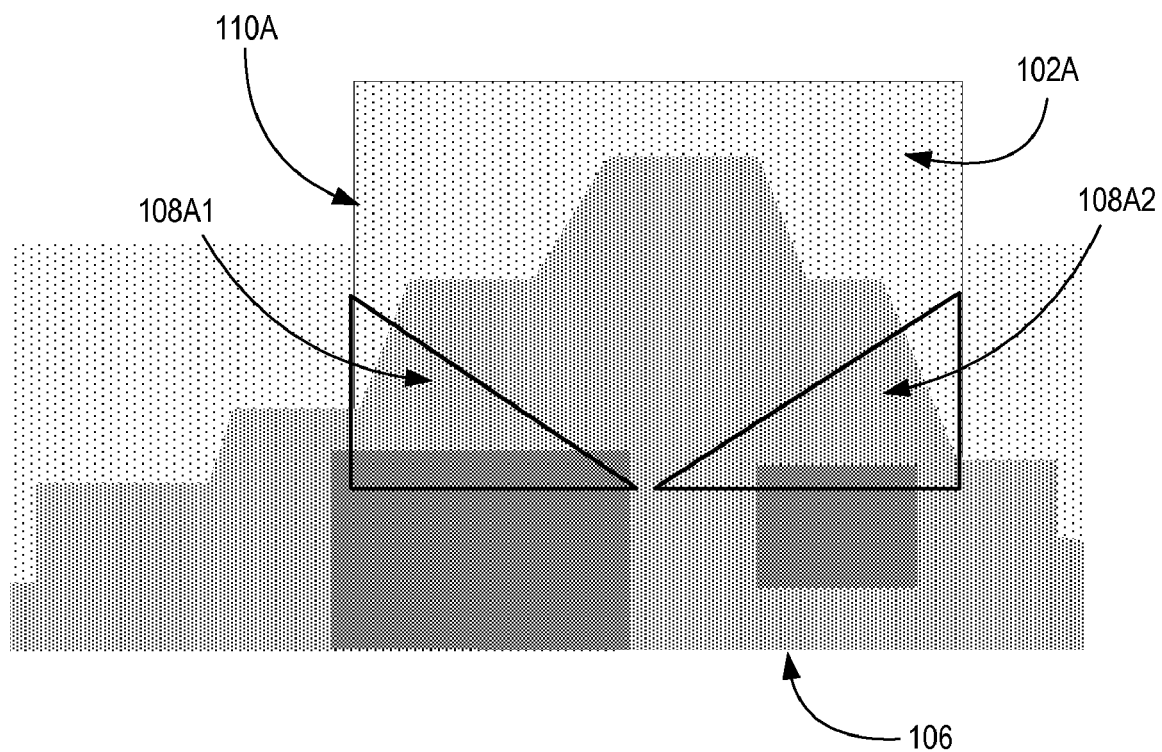

FIG. 3F shows image 102C overlapping and aligned with images 102B and 102C to form the complete panoramic image 106. Regions 108A1 and 108A2 represent overlapping portions of the images and are the blended regions of the images. Note again that image 102A overlaps images 102B and 102C. Rectangle (blend mask) 110A, which encompasses regions 108A1 and 108A2, represents a blend mask that may be generated for blending the images. Each element or entry in blend mask 110A represents a value that determines or specifies the visibility of a corresponding pixel in the images associated with the blend mask. Note that, while blend mask 110A is shown in FIG. 3F as a rectangle that encompasses the entire image, the actual blend mask 110A may be a smaller rectangle or trapezoid that encompasses only a portion of the entire image that includes at least the blend regions 108A1 and 108A2, or alternatively may be generated as two separate blend masks 110 each encompassing one of the blend regions 108.

Figure 3G:
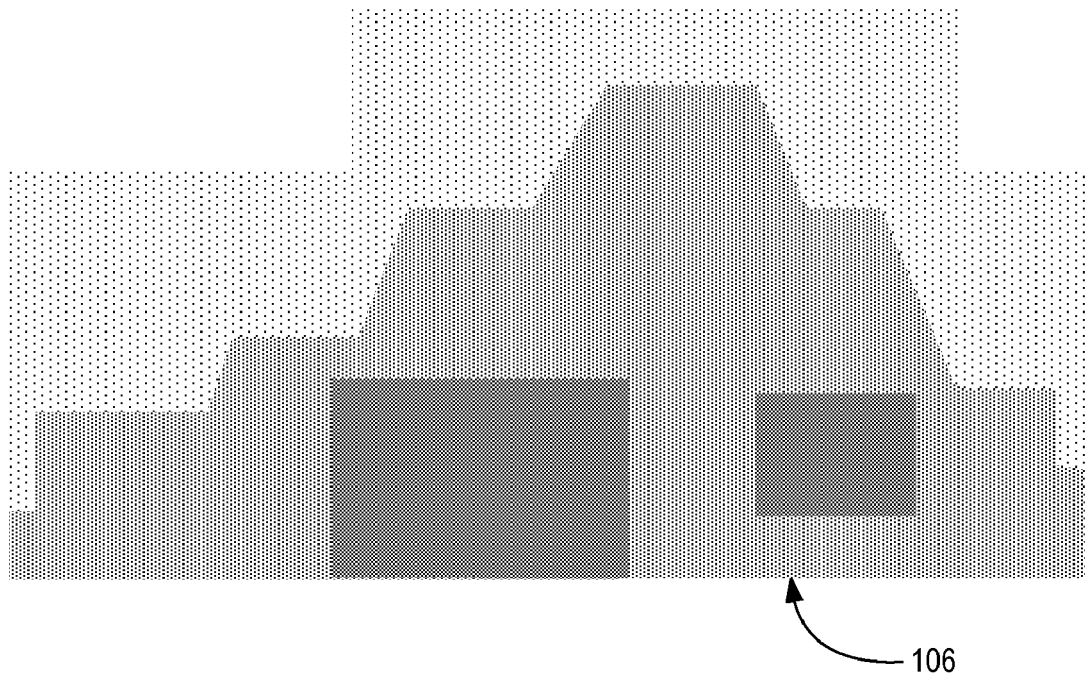

FIG. 3G shows the resultant panoramic image 106, with the three input images 102A, 102B, and 102C aligned and masked. Note that, in one embodiment, the panoramic image mechanism may provide one or more mechanisms whereby the individual blend masks, automatically generated during the alignment and masking process described in FIGS. 3A through 3F, may be manually edited to correct for moving objects, misregistration artifacts, and so on.

Figure 3H:
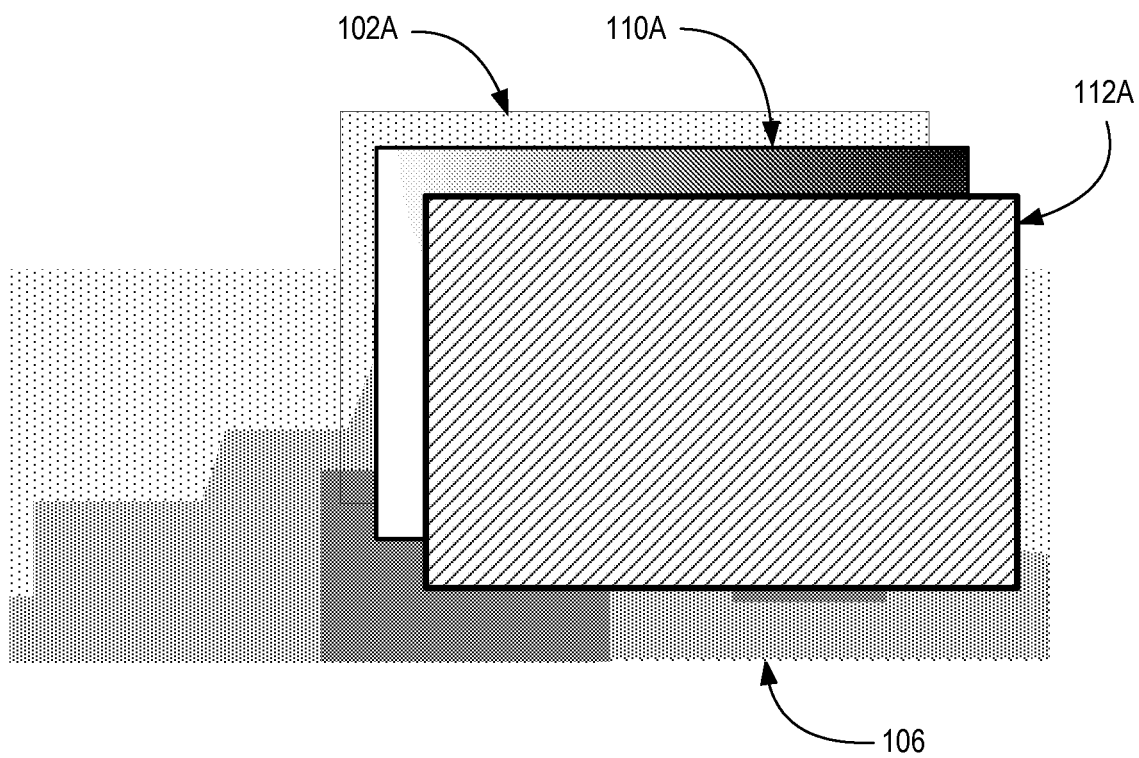

FIG. 3H illustrates the addition of an adjustment layer to the panoramic image by a user. In this example, an adjustment layer 112A has been added for image 102A. An adjustment layer 112 may be added to adjust brightness, color balance, contrast, hue, saturation, curves, etc. in a corresponding image layer 102. Note that FIG. 3H illustrates three layers: image 102A, blend mask 110A, and adjustment layer 112A. Note that additional adjustment layers 112 may be added for image 102A, and that adjustment layers 112 may be added for the other images 102B and 102C. The panoramic image may be stored and maintained as a stack of all the layers in the panoramic images, including the original images 102, blend masks 110, and adjustment layers 112, as shown in FIG. 4.

Figure 4:
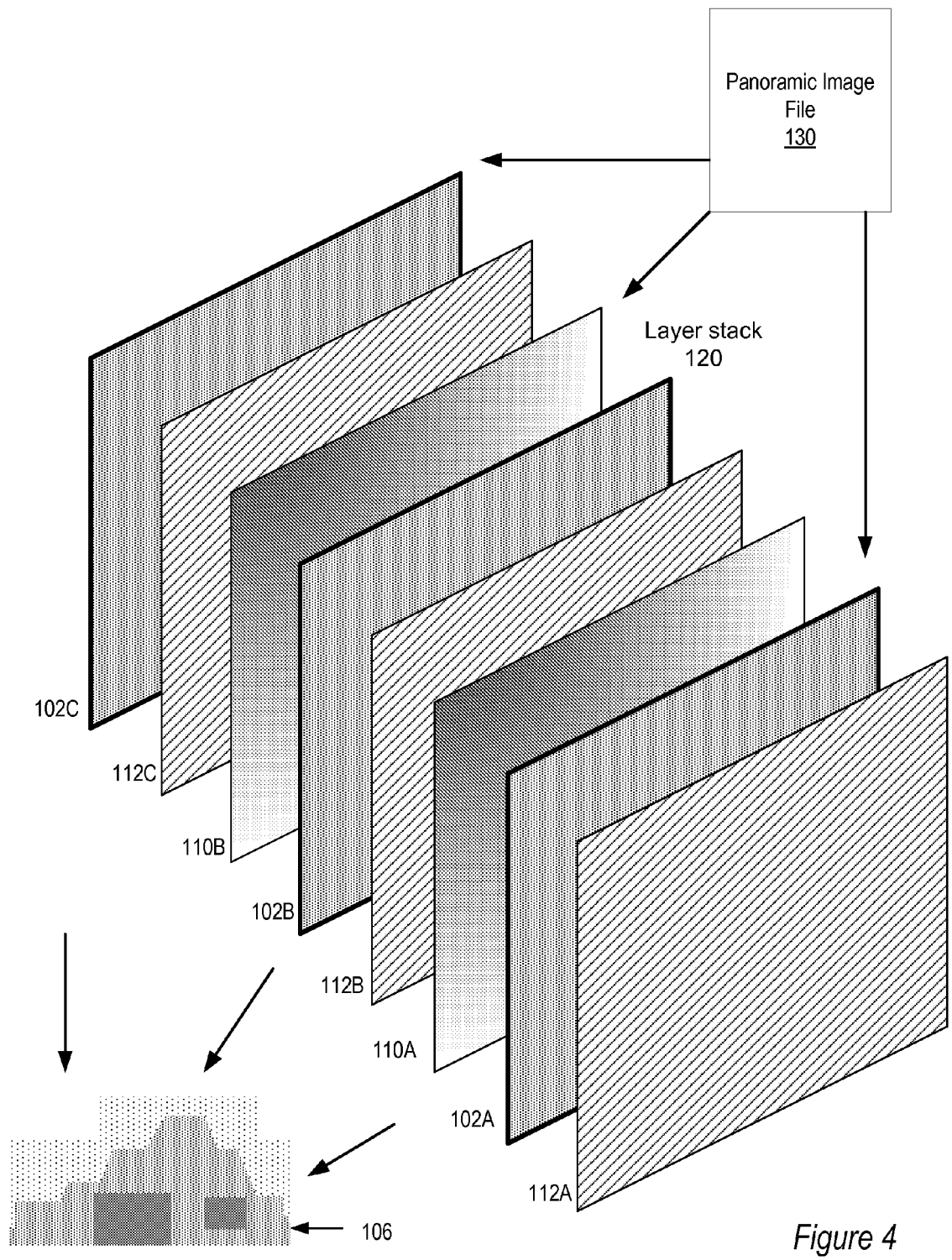
FIG. 4 illustrates a layer stack, according to one embodiment.

FIG. 4 illustrates a layer stack, according to one embodiment. In one embodiment, the layers input into or generated by embodiments of a panoramic image mechanism as described in FIGS. 1 and 2 and FIGS. 3A through 3H may be stored as a layer stack 120 in a panoramic image file 130. In one embodiment, the layers may be conceptually organized into folders or similar structures according to the associated images 102 when displayed to a user for panoramic image manipulation.

Layer stack 120 may include two or more image layers 102, one or more blend mask layers 110, and (optionally) one or more adjustment layers 112. An image processing application that accesses panoramic image file 130 may have one or more mechanisms that enable the application to render the layers as a panoramic image 106 for display, printing, etc. This example shows the images 102A, 102B, and 102C from FIGS. 3A through 3H. Blend mask 110B is the blend mask for blending image 102C with overlapping image 102B, and blend mask 110A is the blend mask for blending images 102B and 102C with overlapping image 102A. Each image 102, in this example, also has an associated adjustment layer 112. Image 102A has adjustment layer 112A, image 102B has adjustment layer 112B, and image 102C has adjustment layer 112C. Note that each image 102 may have zero, one, or more associated adjustment layers 112.

FIG. 5 graphically illustrates a blend mask, according to one embodiment. In one embodiment, a blend mask may be displayed graphically to a user in a manner similar to that shown in FIG. 5 for editing. The blend mask covers overlapping regions of an overlapping image and one or more images beneath the overlapping image. As shown in FIG. 5, a blend mask may be a monochrome image that determines the visibility of the corresponding pixels in an image component or layer. For example, if an area of blend mask elements or pixels are white, then the corresponding image layer pixels may be visible; if an area of blend mask elements or pixels are black, then the corresponding image layer pixels may be transparent, and the pixels in image layers beneath the masked image layer may thus be visible. Intermediate values of the blend mask elements or pixels may be used in performing a blend operation on the corresponding pixels in image layers beneath the masked image layer. Note that the handling of the blend mask values may be performed in the reverse fashion, whereby if an area of blend mask elements or pixels are black, then the corresponding image layer pixels may be visible, and so on.

FIG. 6A illustrates an exemplary blend mask as automatically generated, according to one embodiment. In this Figure, values in the blend mask elements are shown in hexadecimal format, for example with FF representing the decimal value 255 and corresponding to "black", and assuming an 8-bit value is used for the elements in the blend mask. Note that elements in the lower right portion of the blend mask are set to FF, and are thus "black", and thus the corresponding image layer pixels may be transparent, and the pixels in image layers beneath the masked image layer may thus be visible. Elements in the upper left portion of the blend mask are set to 00, and are thus "white", and thus the corresponding image layer pixels may be visible. Further note the intermediate values of the blend mask elements or pixels along the border between the 00 pixels and the FF pixels that may be used in performing a blend operation on the corresponding pixels in image layers beneath the masked image layer.

FIG. 6B illustrates an exemplary manually edited blend mask, according to one embodiment. In one embodiment, the panoramic image mechanism may provide one or more user interface mechanisms whereby a user may edit a blend mask, such as the blend mask illustrated in FIG. 6A, to correct for moving objects, misregistration artifacts, and so on. For example, an overlapping image may obscure the hand of a person that is visible in an underlying image, or a portion of an object may show in an overlapping image that needs to be removed by "unmasking" a portion of the underlying image. In FIG. 6B, a user has modified the blend mask by extending the region of black (FF) pixels into the region of white (00) pixels to unmask a portion of the underlying image. Note that a similar operation could be performed to extend the white (00) pixels to mask a portion of the underlying image by making visible the corresponding portion of the overlapping image.

Figure 7A:
FIGS. 7A through 7C illustrate the alignment and blending of an actual set of images to generate a panoramic image, according to one embodiment.
Figure 7B:
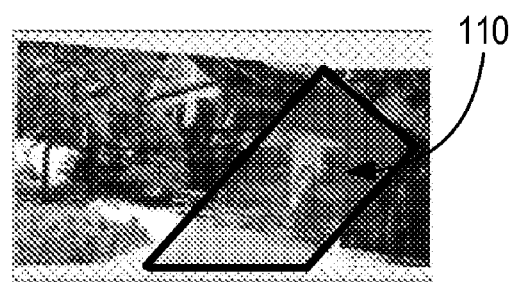
Figure 7C:
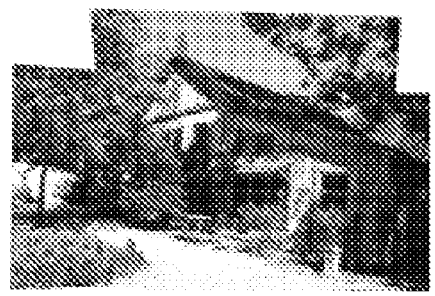

FIGS. 7A through 7C illustrate the alignment and blending of an actual set of images to generate a panoramic image, according to one embodiment. FIG. 7A shows automatically generated blends for panoramic image. Note that image B overlaps image C, and image A overlaps image B and image C. FIG. 7B shows two overlapping images (B and C), with an automatically generated blend mask 110. FIG. 7C shows the finished (aligned and blended) panoramic image.

Figure 8A:
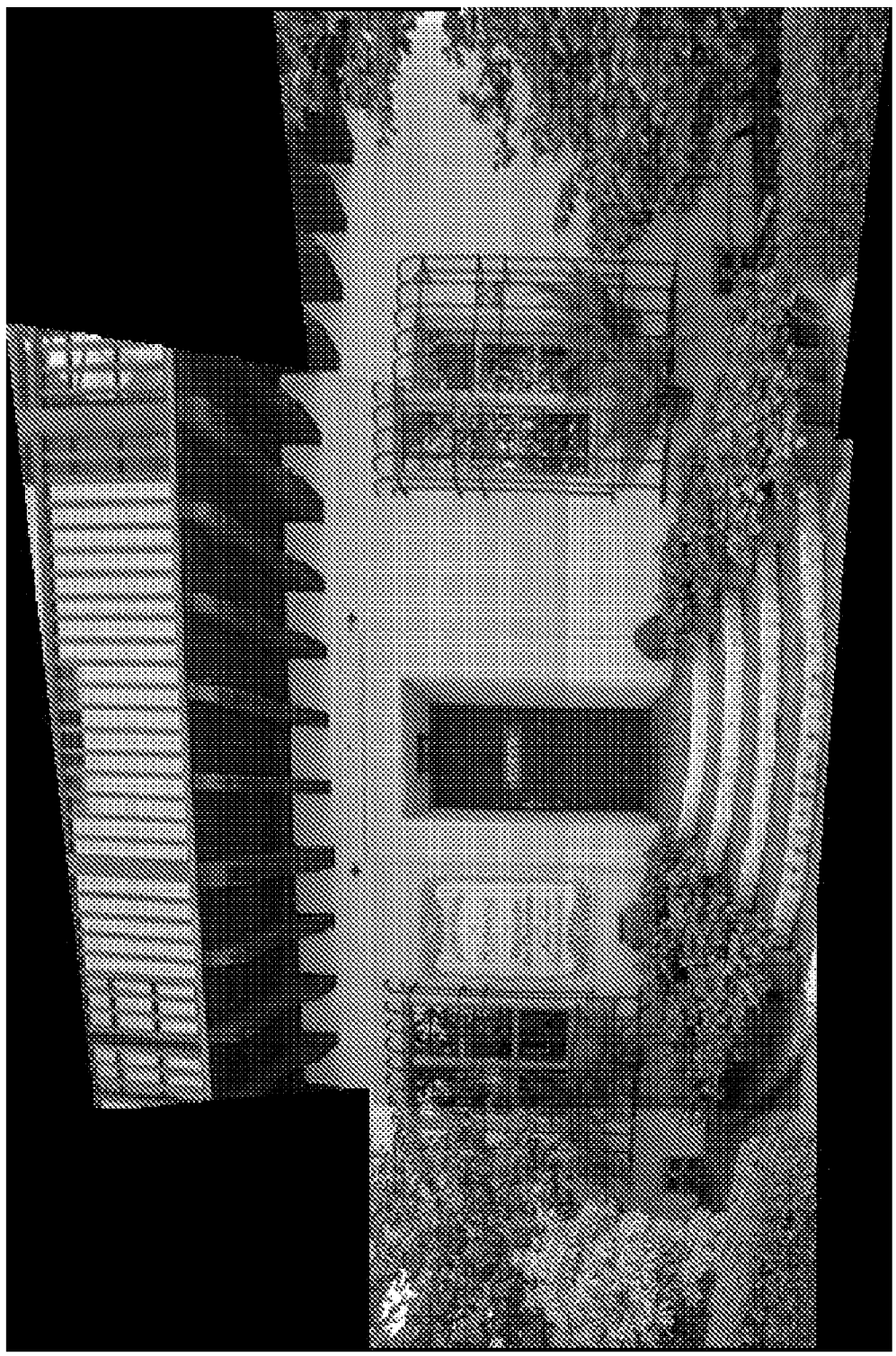
FIGS. 8A through 8D illustrate the alignment, blending, and adjustment of an actual set of images to generate a panoramic image, according to one embodiment.
Figure 8B:
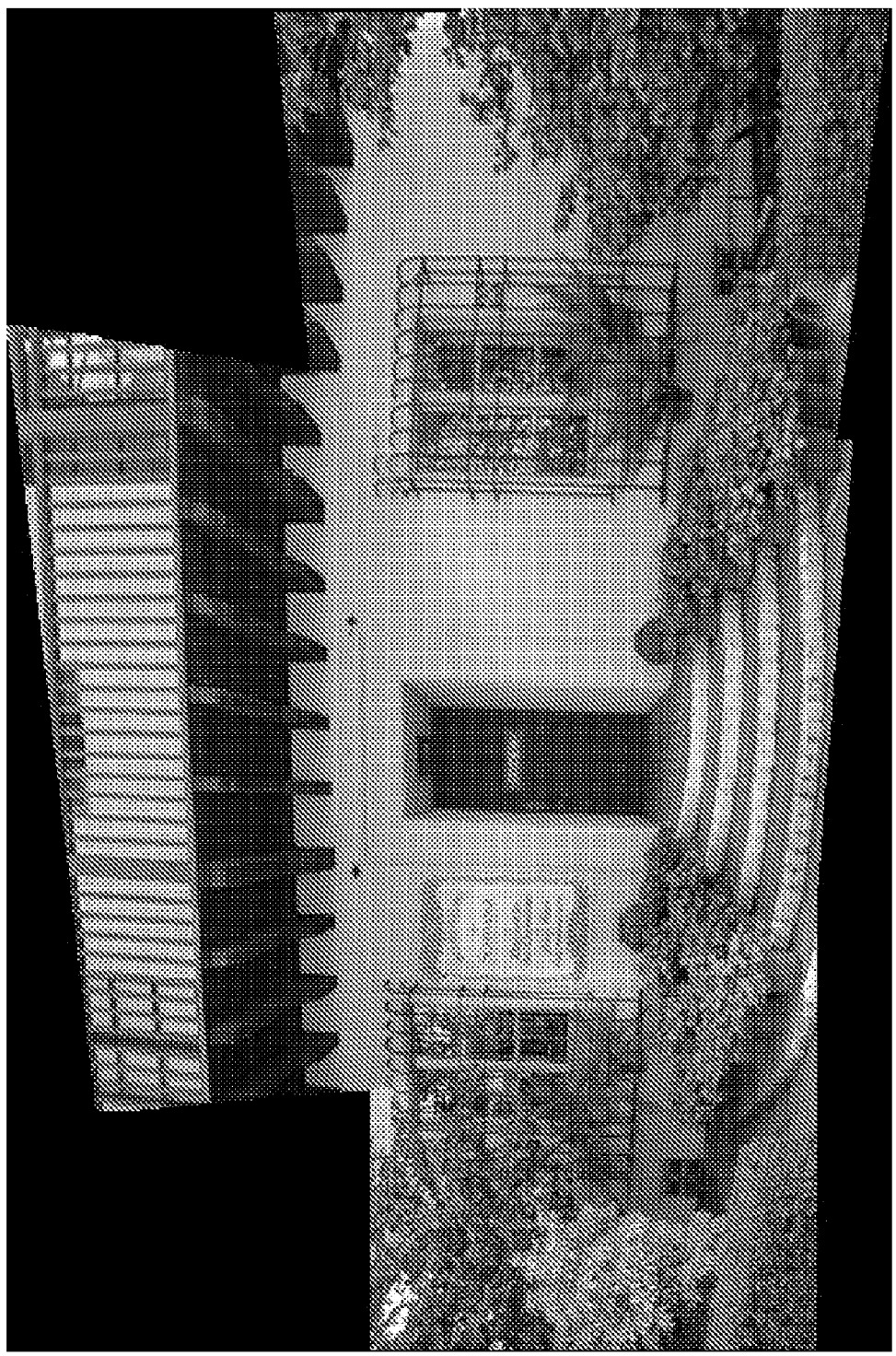
Figure 8C:
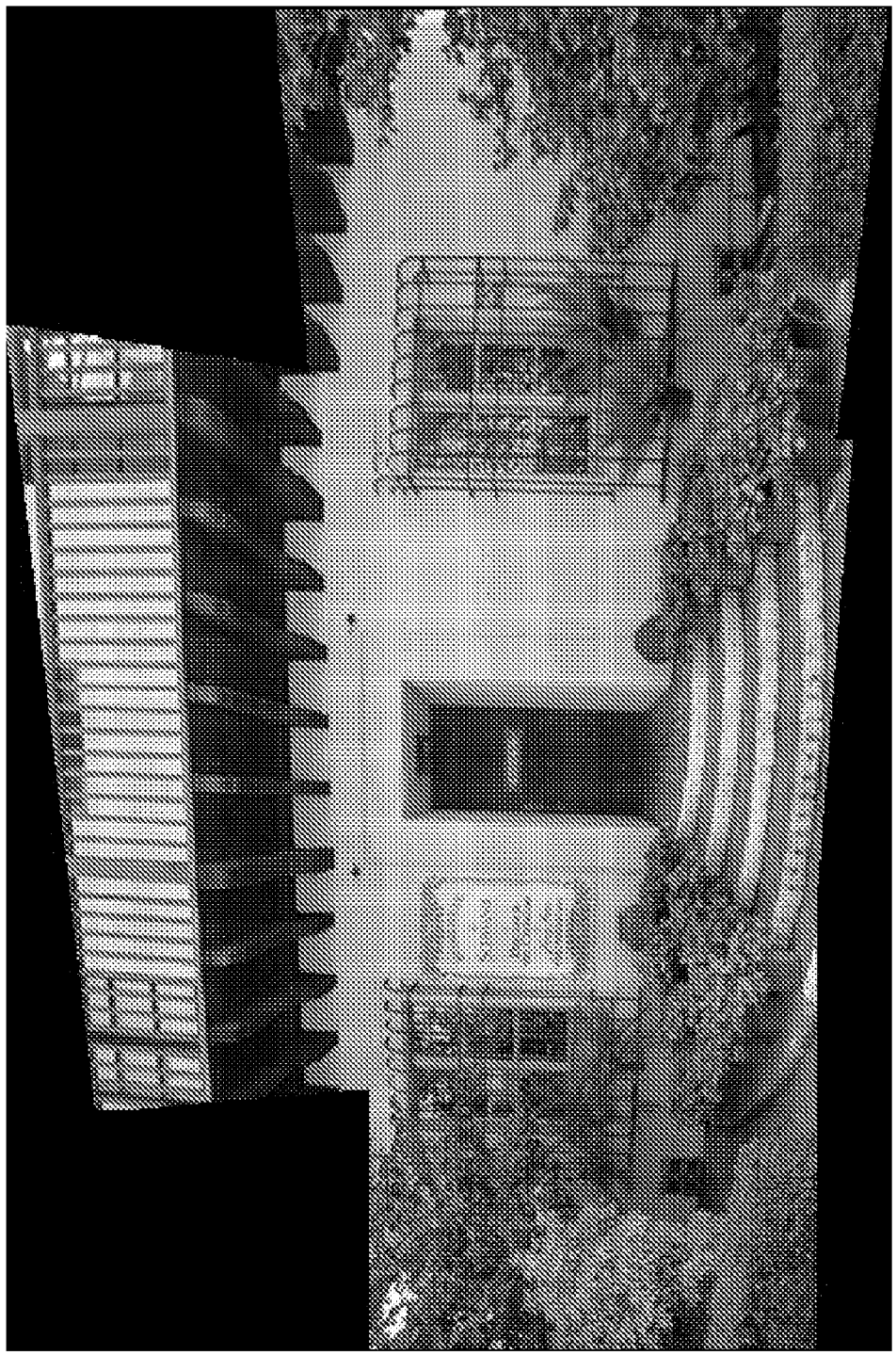
Figure 8D:

FIGS. 8A through 8D illustrate the alignment, blending, and adjustment of an actual set of images to generate a panoramic image, according to one embodiment. FIG. 8A shows two overlapping and aligned image layers, with no blending. FIG. 8B shows the two overlapping and aligned image layers with blend masks added. FIG. 8C shows the two overlapping and aligned image layers with blend masks and color and brightness adjustment layers added. FIG. 8D shows the resultant panoramic image along with an exemplary layers pallet user interface that may display the blend masks and adjustment layers, and which includes various user interface elements whereby the user may select layers, manipulate the various layers, add adjustment layers, delete selected adjustment layers, and so on. Note that, in one embodiment, functions initiated by a user via the user interface may be implemented by a script or scripts that leverages mechanisms provided by an image processing application, as previously described.

Figure 9:
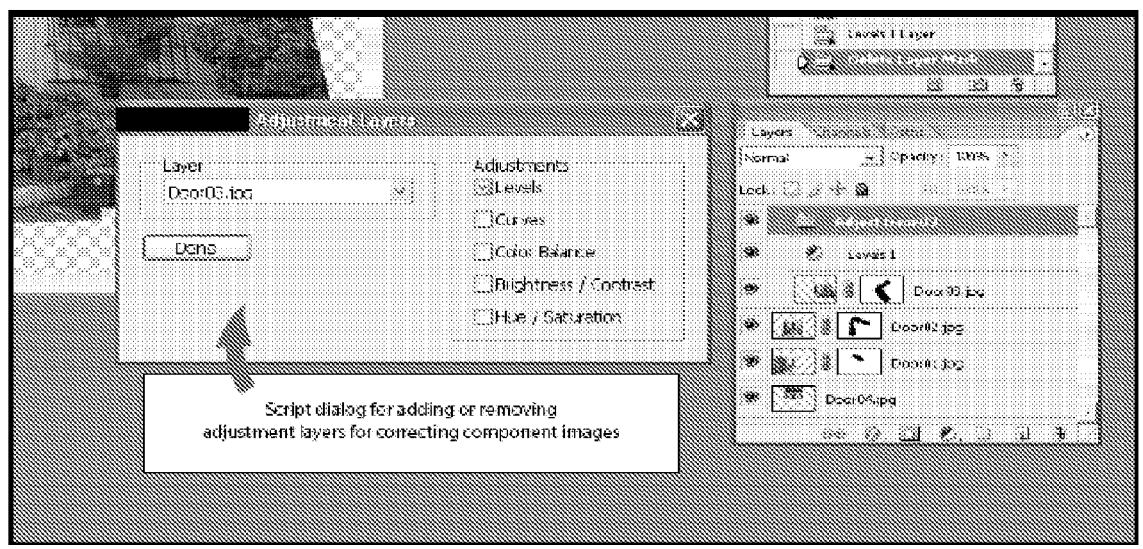
FIG. 9 illustrates an exemplary layers pallet user interface along with an adjustment layers user interface for adding or removing adjustment layers, according to one embodiment.

FIG. 9 illustrates an exemplary layers pallet user interface along with an adjustment layers user interface for adding or removing adjustment layers, according to one embodiment. Note that, in one embodiment, functions initiated by a user via the user interfaces may be implemented by a script or scripts that leverages mechanisms provided by an image processing application, as previously described.

Figure 10:
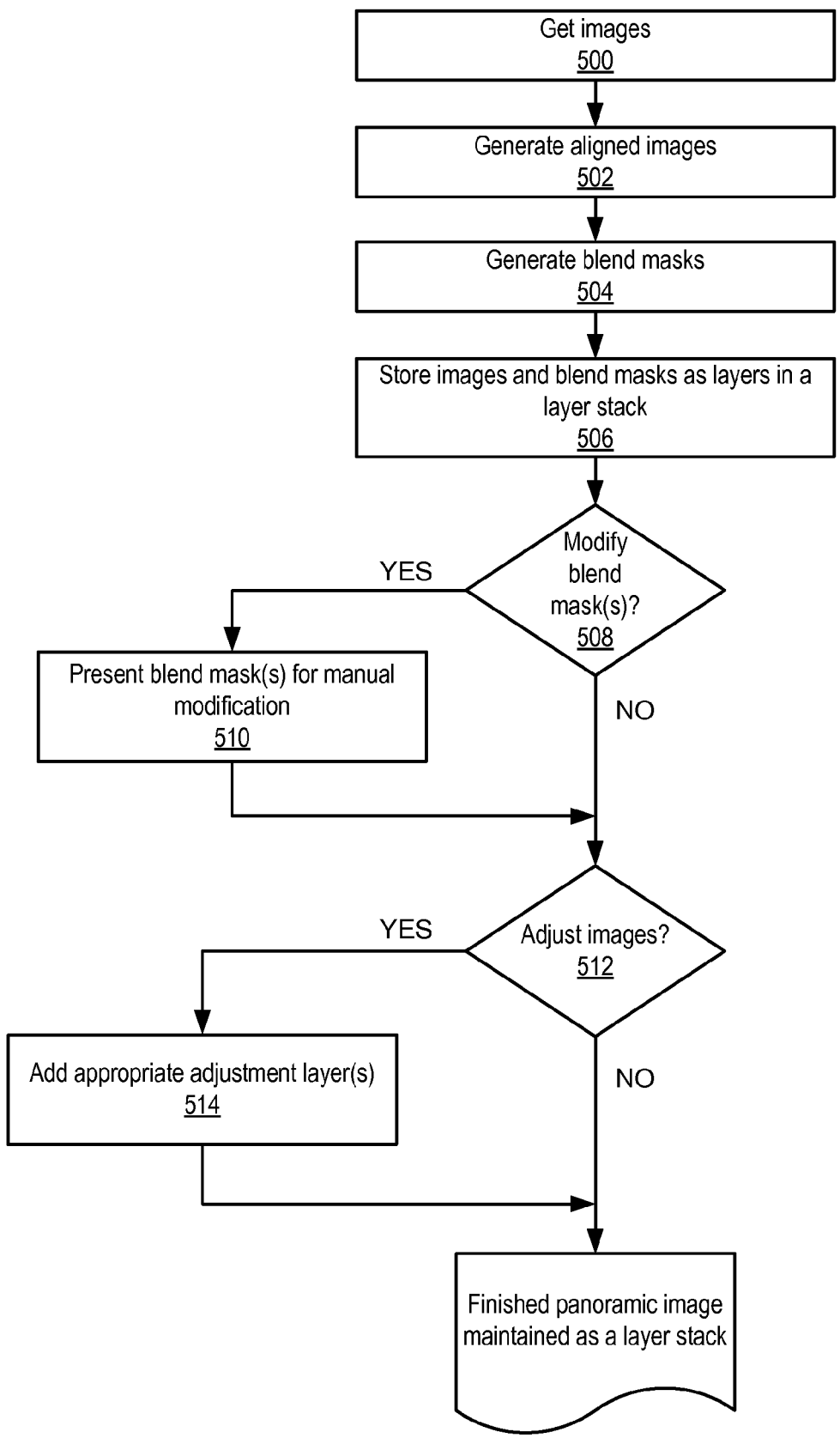
FIG. 10 is a flowchart of a method for layer-based panoramic image blending, adjustment and editing according to one embodiment.

FIG. 10 is a flowchart of a method for layer-based panoramic image blending, adjustment and editing according to one embodiment. Note that, in one embodiment, the elements of FIG. 10 may be implemented via one or more scripts that may leverage the functionalities of an image processing application to perform specific tasks, such as image alignment.

As indicated at 500, two or more component images that each represent a portion of a panoramic scene may be captured. The images may be captured in a digital format or may be otherwise captured and converted to a digital format. The images may be provided by a user as input into a panoramic image mechanism.

As indicated at 502, the panoramic image mechanism may automatically perform an alignment of the input images. As indicated at 504, the panoramic image mechanism may automatically generate blend masks on the overlapping areas of the images. The images and blend masks may be stored as layers in a layer stack, as indicated at 506. Note that alignment information for the images may also be stored. Further note that the original component images may not be modified, but instead may be stored and maintained with their original image content.

As indicated at 508, the panoramic image mechanism may provide a mechanism for the user to manually modify a blend mask, if necessary or desired. A user may desire to modify a blend mask, for example to unmask artifacts that are visible in an underlying image but blocked by an overlying image. If the user chooses to modify a blend mask, the blend mask may be graphically or textually presented to the user by the panoramic image mechanism for manual modification or editing, as indicated at 510.

As indicated at 512, the panoramic image mechanism may provide a mechanism for the user to add adjustment layers to the component images of the panoramic image as necessary or desired. Adjustment layers may be applied by the user as necessary or desired to correct for brightness, exposure, color balance, contrast, hue and saturation, etc., or other differences between the component images. If the user chooses to add an adjustment layer or adjustment layers to the component images of the panoramic image, the panoramic image mechanism may present a user interface to the user, such as the exemplary user interfaces shown in FIG. 8D and FIG. 9, that enables the user to add appropriate adjustment layers, as indicated at 514. The adjustment layers are added to the layer stack. The finished panoramic image may be maintained as a layer stack in a panoramic image file.

Note that FIG. 10 shows editing of blend masks before adding adjustment layers in the flow chart. However, these operations may be performed in any order. A user may add adjustment layers and then modify blend masks as necessary or desired, or may add an adjustment layer, modify a blend mask, add another adjustment layer, and so on.

Further note that, since the panoramic image is maintained as a layer stack, the "finished" panoramic image may be accessed by the user via the panoramic image mechanism to further modify the blend masks and/or to modify, add, or delete adjustment layers.

Exemplary System

Figure 11:
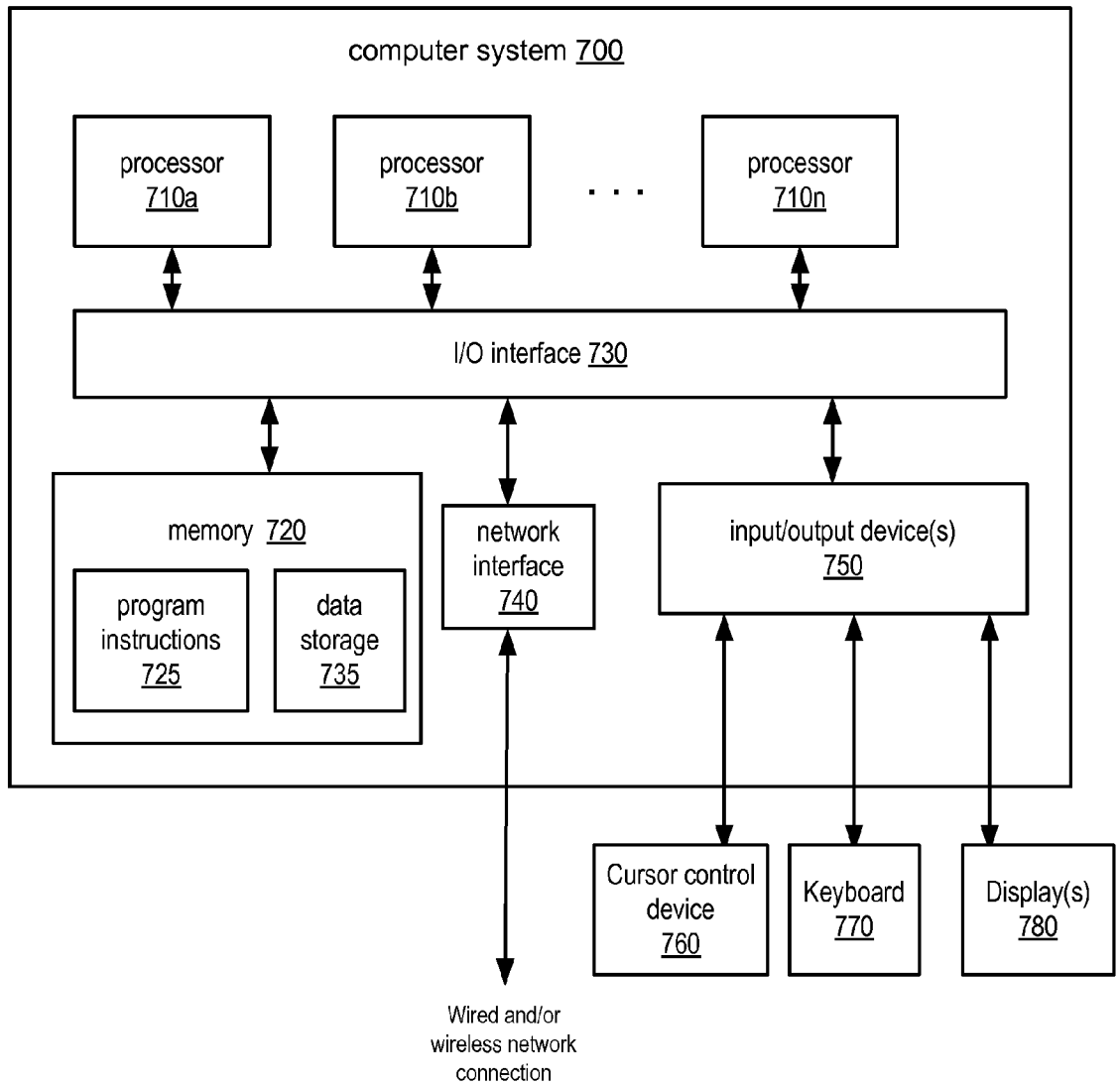
FIG. 11 illustrates an exemplary computer system on which embodiments may be implemented.

Various embodiments of a panoramic image mechanism as described herein may be executed on one or more computer systems, which may interact with various other devices. One such computer system is illustrated by FIG. 11. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for the panoramic image mechanism, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 11, memory 720 may include program instructions 725, configured to implement embodiments of the panoramic image mechanism as described herein, and data storage 735, comprising various data accessible by program instructions 725. In one embodiment, program instructions 725 may include software elements of a panoramic image mechanism as illustrated in FIGS. 1 and 2. Data storage 735 may include data that may be used in some embodiments. In other embodiments, different software elements and data may be included.

Those skilled in the art will appreciate that computer system 700 is merely illustrative and is not intended to limit the scope of the panoramic image mechanism as described herein. In particular, the computer system and devices may include any combination of hardware or software that can perform the indicated functions, including but not limited to computers, network devices, internet appliances, PDAs, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   generating, by one or more computing devices, a panoramic image file for rendering a panoramic image of a scene from two or more input component images, wherein said generating the panoramic image file comprises:
   automatically generating image alignment information for the two or more component images, wherein the image alignment information indicates how each of the component images is positioned relative to the other component images in the panoramic image;
   automatically generating at least one blend mask for the component images, wherein a blend mask is generated for each component image that is in front of at least one other component image in the panoramic image, and wherein each blend mask indicates how a respective component image is to be blended with at least one other component image that is behind the respective component image in the panoramic image;
   generating at least one adjustment layer for the component images, wherein each adjustment layer indicates an adjustment to correct for an exposure difference between a respective component image and the other component images in the panoramic image; and
   storing the image alignment information, the two or more component images, the at least one blend mask, and the at least one adjustment layer in the panoramic image file, wherein the two or more component images, the at least one adjustment layer, and the at least one blend mask are each stored as a separate layer of a layer stack in the panoramic image file;
   wherein said generating a panoramic image file does not modify the two or more input component images stored as separate layers in the layer stack.

2. The method as recited in claim 1, wherein exposure differences include brightness, contrast, color balance, hue, saturation, and white and black points.

3. The method as recited in claim 1, further comprising deleting an adjustment layer from the layer stack in response to user input.

4. The method as recited in claim 1, wherein said automatically generating image alignment information for the two or more component images, said automatically generating at least one blend mask for the component images, said generating generating at least one adjustment layer for the component images, and said storing the image alignment information, the two or more component images, the at least one blend mask, and the at least one adjustment layer in the panoramic image file are implemented via one or more scripts that leverage the functionality of an image processing application.

5. The method as recited in claim 1, further comprising rendering, by the one or more computing devices, the panoramic image of the scene according to the panoramic image file, wherein said rendering comprises:
   aligning the two or more component images according to the image alignment information to position each component image in the panoramic image;
   applying the at least one adjustment layer to correct for exposure differences of the component images in the panoramic image; and
   applying the at least one blend mask to blend at least one region of a respective component image with at least one other component image that is behind the respective component image in the panoramic image;
   wherein said rendering the panoramic image of the scene according to the panoramic image file does not modify content of the panoramic image file.

6. The method as recited in claim 1, further comprising modifying one of the at least one automatically generated blend masks in response to user input.

7. The method as recited in claim 6, wherein said modification of the automatically generated blend mask exposes a portion of one of the component images hidden by the blend mask or hides a portion of one of the component images that is exposed by the blend mask.

8. A system, comprising:
   at least one processor; and
   a memory comprising program instructions, wherein the program instructions are executable by the at least one processor to implement a panoramic image mechanism configured to generate a panoramic image file for rendering a panoramic image of a scene from two or more input component images, wherein, to generate the panoramic image file, the panoramic image mechanism is configured to:
      automatically generate image alignment information for the two or more component images, wherein the image alignment information indicates how each of the component images is positioned relative to the other component images in the panoramic image;
      automatically generate at least one blend mask for the component images, wherein a blend mask is generated for each component image that is in front of at least one other component image in the panoramic image, and wherein each blend mask indicates how a respective component image is to be blended with at least one other component image that is behind the respective component image in the panoramic image;
      generate at least one adjustment layer for the component images, wherein each adjustment layer indicates an adjustment to correct for an exposure difference between a respective component image and the other component images in the panoramic image; and
      store the image alignment information, the two or more component images, the at least one blend mask, and the at least one adjustment layer in the panoramic image file, wherein the two or more component images, the at least one adjustment layer, and the at least one blend mask are each stored as a separate layer of a layer stack in the panoramic image file;
      wherein said generating a panoramic image file does not modify the two or more input component images stored as separate layers in the layer stack.

9. The system as recited in claim 8, wherein exposure differences include brightness, contrast, color balance, hue, saturation, and white and black points.

10. The system as recited in claim 8, wherein the panoramic image mechanism is further configured to delete an adjustment layer from the layer stack in response to user input.

11. The system as recited in claim 8, wherein said panoramic image mechanism is implemented as one or more scripts that leverage the functionality of an image processing application.

12. The system as recited in claim 8, wherein the panoramic image mechanism is further configured to render the panoramic image of the scene according to the panoramic image file, wherein, to render the panoramic image, the panoramic image mechanism is configured to:
   align the two or more component images according to the image alignment information to position each component image in the panoramic image;
   apply the at least one adjustment layer to correct for exposure differences of the component images in the panoramic image; and
   apply the at least one blend mask to blend at least one region of a respective component image with at least one other component image that is behind the respective component image in the panoramic image;
   wherein said rendering the panoramic image of the scene according to the panoramic image file does not modify content of the panoramic image file.

13. The system as recited in claim 8, wherein the panoramic image mechanism is further configured to modify one of the at least one automatically generated blend masks in response to user input.

14. The system as recited in claim 13, wherein said modification of the automatically generated blend mask exposes a portion of one of the component images hidden by the blend mask or hides a portion of one of the component images that is exposed by the blend mask.

15. A non-transitory computer-readable storage medium storing program instructions that when executed by a computer implement a panoramic image mechanism configured to:
   automatically generate image alignment information for the two or more component images, wherein the image alignment information indicates how each of the component images is positioned relative to the other component images in the panoramic image;
   automatically generate at least one blend mask for the component images, wherein a blend mask is generated for each component image that is in front of at least one other component image in the panoramic image, and wherein each blend mask indicates how a respective component image is to be blended with at least one other component image that is behind the respective component image in the panoramic image;
   generate at least one adjustment layer for the component images, wherein each adjustment layer indicates an adjustment to correct for an exposure difference between a respective component image and the other component images in the panoramic image; and
   store the image alignment information, the two or more component images, the at least one blend mask, and the at least one adjustment layer in the panoramic image file, wherein the two or more component images, the at least one adjustment layer, and the at least one blend mask are each stored as a separate layer of a layer stack in the panoramic image file;

wherein said generating a panoramic image file does not modify the two or more input component images stored as separate layers in the layer stack.

16. The non-transitory computer-readable storage medium as recited in claim 15, wherein exposure differences include brightness, contrast, color balance, hue, saturation, and white and black points.

17. The non-transitory computer-readable storage medium as recited in claim 15, wherein the panoramic image mechanism is further configured to delete an adjustment layer from the layer stack in response to user input.

18. The non-transitory computer-readable storage medium as recited in claim 15, wherein said panoramic image mechanism is implemented as one or more scripts that leverage the functionality of an image processing application.

19. The non-transitory computer-readable storage medium as recited in claim 15, wherein the panoramic image mechanism is further configured to render the panoramic image of the scene according to the panoramic image file, wherein, to render the panoramic image, the panoramic image mechanism is configured to:

align the two or more component images according to the image alignment information to position each component image in the panoramic image;

apply the at least one adjustment layer to correct for exposure differences of the component images in the panoramic image; and apply the at least one blend mask to blend at least one region of a respective component image with at least one other component image that is behind the respective component image in the panoramic image;

wherein said rendering the panoramic image of the scene according to the panoramic image file does not modify content of the panoramic image file.

20. The non-transitory computer-readable storage medium as recited in claim 15, wherein the panoramic image mechanism is further configured to modify one of the at least one automatically generated blend masks in response to user input.

21. The non-transitory computer-readable storage medium as recited in claim 20, wherein said modification of the automatically generated blend mask exposes a portion of one of the component images hidden by the blend mask or hides a portion of one of the component images that is exposed by the blend mask.

* * * * *

UNITED STATES PATENT AND TRADEMARK OFFICE
CERTIFICATE OF CORRECTION

| | | |
|---|---|---|
| PATENT NO. | : 8,368,720 B2 | Page 1 of 1 |
| APPLICATION NO. | : 11/610099 | |
| DATED | : February 5, 2013 | |
| INVENTOR(S) | : John W. Peterson | |

It is certified that error appears in the above-identified patent and that said Letters Patent is hereby corrected as shown below:

In the Claims:

Column 14, lines 66 and 67, delete "generating generating" and insert --generating--, therefor.

Signed and Sealed this
Seventh Day of May, 2013

Teresa Stanek Rea
*Acting Director of the United States Patent and Trademark Office*